US012639885B2

(12) United States Patent
Poot

(10) Patent No.: US 12,639,885 B2
(45) Date of Patent: May 26, 2026

(54) STEREO DEPTH MARKERS

(71) Applicant: Apple Inc., Cupertino, CA (US)

(72) Inventor: Rudy Poot, Mill Valley, CA (US)

(73) Assignee: Apple Inc., Cupertino, CA (US)

( * ) Notice: Subject to any disclaimer, the term of this patent is extended or adjusted under 35 U.S.C. 154(b) by 249 days.

(21) Appl. No.: 18/222,000

(22) Filed: Jul. 14, 2023

(65) Prior Publication Data

US 2024/0078743 A1 Mar. 7, 2024

Related U.S. Application Data

(60) Provisional application No. 63/392,637, filed on Jul. 27, 2022.

(51) Int. Cl.
| | |
|---|---|
| *G06T 15/10* | (2011.01) |
| *G06T 7/246* | (2017.01) |
| *G06T 7/593* | (2017.01) |
| *G06T 7/73* | (2017.01) |
| *G06T 15/80* | (2011.01) |
| *H04N 13/122* | (2018.01) |
| *H04N 13/344* | (2018.01) |
| *H04N 13/00* | (2018.01) |

(52) U.S. Cl.
CPC .............. *G06T 15/10* (2013.01); *G06T 7/246* (2017.01); *G06T 7/593* (2017.01); *G06T 7/73* (2017.01); *G06T 15/80* (2013.01); *H04N 13/122* (2018.05); *H04N 13/344* (2018.05); *G06T 2207/10012* (2013.01); *G06T 2207/20081* (2013.01); *H04N 2013/0081* (2013.01)

(58) Field of Classification Search
CPC ........... G06T 15/10; G06T 7/246; G06T 7/73; G06T 7/593; G06T 15/80; G06T 2207/10012; G06T 2207/20081; H04N 13/344; H04N 13/122; H04N 2013/0081
See application file for complete search history.

(56) References Cited

U.S. PATENT DOCUMENTS

| | | | | |
|---|---|---|---|---|
| 5,383,013 A * | 1/1995 | Cox | ......................... | G06T 7/593 |
| | | | | 348/E13.014 |
| 7,616,885 B2 * | 11/2009 | Chen | ...................... | G03B 35/16 |
| | | | | 348/42 |
| 8,705,844 B2 * | 4/2014 | Lee | ....................... | H04N 13/128 |
| | | | | 348/51 |
| 9,754,417 B2 * | 9/2017 | Matsubayashi | ....... | G02B 27/017 |
| 9,767,606 B2 * | 9/2017 | Kapinos | ................ | G06T 19/003 |
| 10,254,846 B1 * | 4/2019 | Kinstner | ............... | G06F 3/0487 |
| 10,255,727 B1 * | 4/2019 | Gribetz | ................ | G02B 27/017 |
| 10,338,687 B2 * | 7/2019 | Glazier | ................... | G06F 3/013 |

(Continued)

*Primary Examiner* — Charles L Beard
(74) *Attorney, Agent, or Firm* — Thompson Hine LLP

(57) ABSTRACT

Various implementations disclosed herein include devices, systems, and methods that modify a stereoscopic scene using a user-positioned stereo depth marker. In one example, the marker may be used to position content (e.g., computer-generated, virtual content, 3D objects, etc.) on top of/within the stereo scene by providing info about stereo depth, camera height, where features sit in depth in each eye's image, etc. In another example, the marker may additionally or alternatively be used to associate one or more objects, such as a tree depicted within the scene, with the background or foreground aspects/plates, which may then be rendered differently in providing the altered stereo content.

21 Claims, 6 Drawing Sheets

600

(56)  References Cited

U.S. PATENT DOCUMENTS

| | | | |
|---|---|---|---|
| 10,417,827 B2* | 9/2019 | Pahud | G06F 3/038 |
| 10,516,853 B1* | 12/2019 | Gibson | H04N 7/157 |
| 10,665,011 B1* | 5/2020 | Sunkavalli | G06F 15/50 |
| 10,748,342 B2* | 8/2020 | Joyce | G06F 3/04815 |
| 10,802,600 B1* | 10/2020 | Ravasz | G06F 3/013 |
| 10,824,923 B1* | 11/2020 | Forster | G06V 20/00 |
| 10,852,814 B1* | 12/2020 | Caron | G06T 19/006 |
| 10,897,558 B1* | 1/2021 | Sun | G06T 5/20 |
| 10,922,892 B1* | 2/2021 | Bhushan | G06F 3/04883 |
| 10,976,804 B1* | 4/2021 | Atlas | G06F 3/017 |
| 11,023,035 B1* | 6/2021 | Atlas | G06F 3/014 |
| 11,023,036 B1* | 6/2021 | Atlas | G06F 3/04815 |
| 11,042,984 B2* | 6/2021 | Hall | G06T 7/11 |
| 11,049,324 B2* | 6/2021 | Yin | G06T 7/74 |
| 11,057,612 B1* | 7/2021 | Clemens | H04N 13/275 |
| 11,210,863 B1* | 12/2021 | Yan | G06T 19/20 |
| 11,335,068 B2* | 5/2022 | Schubert | G06F 3/017 |
| 11,580,700 B2* | 2/2023 | Egri | G06T 19/20 |
| 11,822,728 B2* | 11/2023 | Ha | G06V 40/18 |
| 11,875,530 B2* | 1/2024 | Aoki | G06T 7/73 |
| 12,100,173 B2* | 9/2024 | Bhutani | G06N 3/0455 |
| 12,148,113 B2* | 11/2024 | Fujiwara | G06F 3/013 |
| 12,159,467 B1* | 12/2024 | Rasheed | G06T 17/00 |
| 12,299,150 B2* | 5/2025 | Cho | G06T 19/20 |
| 2004/0066555 A1* | 4/2004 | Nomura | H04N 13/275 |
| | | | 359/462 |
| 2006/0087556 A1* | 4/2006 | Era | H04N 13/361 |
| | | | 348/51 |
| 2006/0244745 A1* | 11/2006 | Majer | G06F 3/04815 |
| | | | 345/419 |
| 2007/0156017 A1* | 7/2007 | Lamprecht | A61B 1/00194 |
| | | | 600/102 |
| 2010/0014781 A1* | 1/2010 | Liu | H04N 13/128 |
| | | | 382/285 |
| 2010/0066811 A1* | 3/2010 | Chang | H04N 13/246 |
| | | | 348/E13.001 |
| 2010/0182400 A1* | 7/2010 | Nelson | G06T 19/006 |
| | | | 348/42 |
| 2010/0220932 A1* | 9/2010 | Zhang | G06T 7/593 |
| | | | 382/209 |
| 2011/0018864 A1* | 1/2011 | Ishibashi | G06T 15/00 |
| | | | 345/419 |
| 2011/0074924 A1* | 3/2011 | Barenbrug | H04N 13/275 |
| | | | 348/E13.001 |
| 2011/0142309 A1* | 6/2011 | Zhang | H04N 17/00 |
| | | | 382/128 |
| 2011/0169831 A1* | 7/2011 | Kao | H04N 13/139 |
| | | | 345/426 |
| 2011/0304693 A1* | 12/2011 | Border | H04N 13/261 |
| | | | 348/46 |
| 2011/0304706 A1* | 12/2011 | Border | H04N 13/172 |
| | | | 348/E13.074 |
| 2012/0117514 A1* | 5/2012 | Kim | G06F 3/017 |
| | | | 345/158 |
| 2012/0154277 A1* | 6/2012 | Bar-Zeev | G02B 27/017 |
| | | | 345/158 |
| 2012/0176477 A1* | 7/2012 | Givon | G06T 17/00 |
| | | | 348/46 |
| 2012/0188235 A1* | 7/2012 | Wu | G06T 7/50 |
| | | | 345/419 |
| 2012/0212590 A1* | 8/2012 | Kang | H04N 13/341 |
| | | | 348/51 |
| 2013/0148851 A1* | 6/2013 | Leung | G06T 7/74 |
| | | | 382/103 |
| 2013/0155106 A1* | 6/2013 | Rolleston | G06T 19/006 |
| | | | 345/633 |
| 2013/0162641 A1* | 6/2013 | Zhang | H04N 13/128 |
| | | | 345/419 |
| 2013/0162762 A1* | 6/2013 | Cohen | H04N 13/261 |
| | | | 348/E9.037 |
| 2013/0328925 A1* | 12/2013 | Latta | G06F 3/017 |
| | | | 345/633 |
| 2014/0085413 A1* | 3/2014 | Matsumoto | H04N 13/106 |
| | | | 348/42 |
| 2014/0111610 A1* | 4/2014 | Ha | H04N 13/261 |
| | | | 348/43 |
| 2014/0169660 A1* | 6/2014 | Cohen | G06T 5/70 |
| | | | 382/154 |
| 2014/0192164 A1* | 7/2014 | Tenn | H04N 13/243 |
| | | | 348/47 |
| 2014/0313188 A1* | 10/2014 | Cohen | H04N 13/106 |
| | | | 345/419 |
| 2014/0376635 A1* | 12/2014 | Senoh | H04N 13/194 |
| | | | 375/240.16 |
| 2015/0226969 A1* | 8/2015 | Tsukahara | G06T 19/20 |
| | | | 359/462 |
| 2016/0012631 A1* | 1/2016 | Kim | G06F 3/147 |
| | | | 345/419 |
| 2016/0117860 A1* | 4/2016 | Fei | H04N 23/45 |
| | | | 345/419 |
| 2016/0196692 A1* | 7/2016 | Kjallstrom | G06T 19/006 |
| | | | 345/633 |
| 2016/0210783 A1* | 7/2016 | Tomlin | G02B 27/017 |
| 2016/0225184 A1* | 8/2016 | Vlemmix | G06Q 30/0631 |
| 2016/0261300 A1* | 9/2016 | Fei | G01B 11/14 |
| 2016/0349510 A1* | 12/2016 | Miller | H04N 13/398 |
| 2016/0349837 A1* | 12/2016 | Miller | H04N 13/344 |
| 2016/0366392 A1* | 12/2016 | Raghoebardajal | H04N 13/332 |
| 2017/0011496 A1* | 1/2017 | Lu | G06T 5/92 |
| 2017/0038728 A1* | 2/2017 | Zschau | G03H 1/2249 |
| 2017/0061700 A1* | 3/2017 | Urbach | G02B 27/017 |
| 2017/0094246 A1* | 3/2017 | Oh | H04N 5/2628 |
| 2017/0237974 A1* | 8/2017 | Samec | H04N 13/122 |
| | | | 348/53 |
| 2017/0270715 A1* | 9/2017 | Lindsay | G06T 7/60 |
| 2017/0323158 A1* | 11/2017 | Gordon | G06F 16/5866 |
| 2018/0046874 A1* | 2/2018 | Guo | G06V 10/507 |
| 2018/0047202 A1* | 2/2018 | Long | G09G 3/003 |
| 2018/0239413 A1 | 8/2018 | Ishikawa et al. | |
| 2018/0286126 A1* | 10/2018 | Schwarz | G06F 3/04845 |
| 2018/0288405 A1* | 10/2018 | Allen | H04N 13/279 |
| 2018/0322701 A1* | 11/2018 | Pahud | G06F 3/038 |
| 2018/0342088 A1* | 11/2018 | Richter | G06T 11/006 |
| 2018/0342103 A1* | 11/2018 | Schwarz | G06F 3/04845 |
| 2019/0025602 A1 | 1/2019 | Qin et al. | |
| 2019/0051052 A1* | 2/2019 | Corazza | G06T 15/60 |
| 2019/0122440 A1* | 4/2019 | Barros | G06T 7/75 |
| 2019/0130631 A1* | 5/2019 | Gebbie | G06F 3/012 |
| 2019/0180499 A1* | 6/2019 | Caulfield | G01C 21/20 |
| 2019/0222823 A1* | 7/2019 | Clagg | H04N 7/183 |
| 2019/0235729 A1* | 8/2019 | Day | G06F 3/04815 |
| 2019/0237044 A1* | 8/2019 | Day | G09G 5/08 |
| 2019/0311527 A1* | 10/2019 | Schwab | G06T 15/20 |
| 2019/0362555 A1* | 11/2019 | Chen | G06T 7/70 |
| 2020/0090405 A1* | 3/2020 | Lagmanson | G06T 19/006 |
| 2020/0186775 A1* | 6/2020 | Lin | H04N 13/344 |
| 2020/0226823 A1* | 7/2020 | Stachniak | G06T 19/006 |
| 2020/0273251 A1* | 8/2020 | Palos | G06T 7/70 |
| 2020/0302698 A1* | 9/2020 | Boissiere | H04N 13/122 |
| 2020/0312015 A1* | 10/2020 | Frommhold | G06T 19/00 |
| 2020/0368616 A1 | 11/2020 | Delamont | |
| 2020/0380790 A1* | 12/2020 | Bédard | G06T 15/60 |
| 2020/0410754 A1* | 12/2020 | Sugano | G06T 3/16 |
| 2021/0104066 A1* | 4/2021 | Haeusler | G06T 7/75 |
| 2021/0150278 A1* | 5/2021 | Dudzik | G06T 7/593 |
| 2021/0150279 A1* | 5/2021 | Dudzik | G01S 17/931 |
| 2021/0211593 A1* | 7/2021 | Overbeck | H04N 25/41 |
| 2021/0232299 A1* | 7/2021 | Qiu | A63F 13/533 |
| 2021/0248835 A1* | 8/2021 | Wiley | G06F 3/04842 |
| 2021/0255485 A1* | 8/2021 | Xu | G06F 3/011 |
| 2021/0287385 A1* | 9/2021 | Watson | G06T 7/11 |
| 2021/0368206 A1* | 11/2021 | Sugano | G06T 15/04 |
| 2021/0374982 A1* | 12/2021 | Velinov | G06T 7/507 |
| 2022/0066569 A1* | 3/2022 | Wang | G06F 3/011 |
| 2022/0103748 A1* | 3/2022 | Canberk | G06V 40/107 |
| 2022/0130126 A1* | 4/2022 | Delgado | G06T 7/521 |
| 2022/0221976 A1* | 7/2022 | Agarwal | G06F 3/0486 |
| 2022/0308657 A1* | 9/2022 | Nagano | G06T 19/20 |
| 2022/0327720 A1* | 10/2022 | Verwoerd | G06T 7/593 |
| 2022/0385721 A1* | 12/2022 | Kamaraju | H04L 67/06 |

(56)        References Cited

U.S. PATENT DOCUMENTS

| | | | |
|---|---|---|---|
| 2022/0409324 A1* | 12/2022 | Shirazian | A61B 90/30 |
| 2023/0277035 A1* | 9/2023 | Proksch | G06T 11/00 |
| | | | 345/632 |
| 2023/0334808 A1* | 10/2023 | Sundstrom | G06F 3/04842 |
| 2023/0396752 A1* | 12/2023 | Jansen dos Reis | G06T 19/20 |
| 2024/0080413 A1* | 3/2024 | Lyren | G02B 27/017 |
| 2024/0104876 A1* | 3/2024 | Couche | G06T 19/20 |
| 2024/0129448 A1* | 4/2024 | Xiong | G06T 7/50 |
| 2024/0131434 A1* | 4/2024 | Wang | A63F 13/5258 |
| 2024/0135662 A1* | 4/2024 | Zhang | G06T 17/20 |
| 2024/0135665 A1* | 4/2024 | Ikeda | G06F 3/011 |
| 2024/0156547 A1* | 5/2024 | Luengo Muntion | G06V 20/41 |
| 2024/0192766 A1* | 6/2024 | Furtwangler | G06F 3/011 |
| 2024/0331099 A1* | 10/2024 | Huberman | G06T 7/593 |
| 2025/0148701 A1* | 5/2025 | Xiong | G06T 7/11 |
| 2025/0383750 A1* | 12/2025 | Lui | G06F 3/04815 |

* cited by examiner

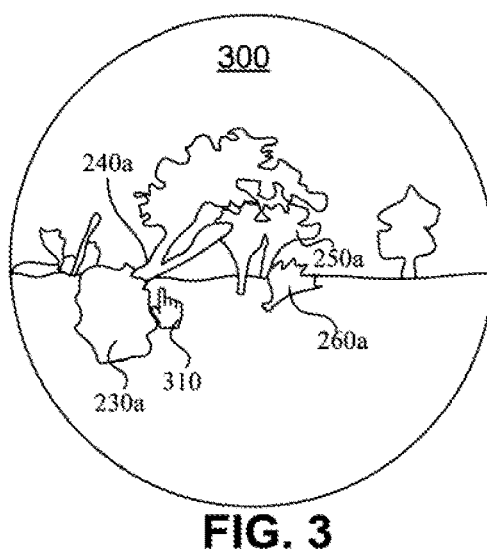
FIG. 3
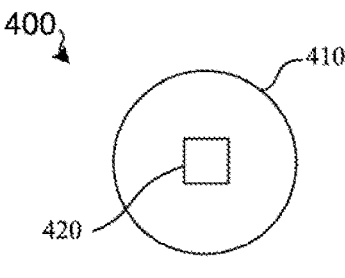
FIG. 4A
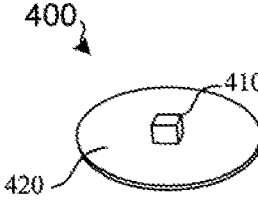
FIG. 4B
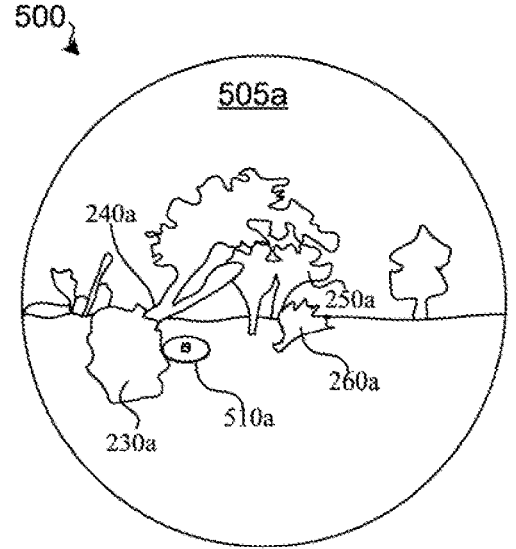
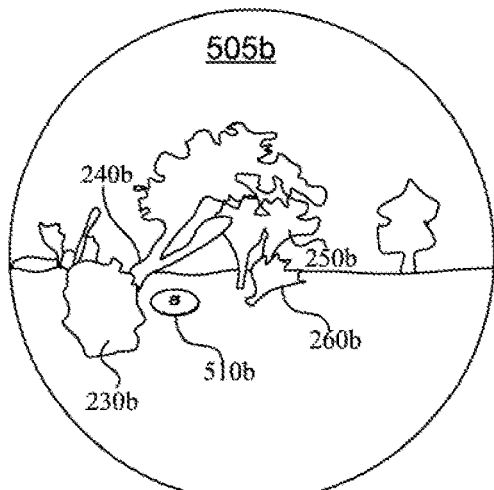
FIG. 5

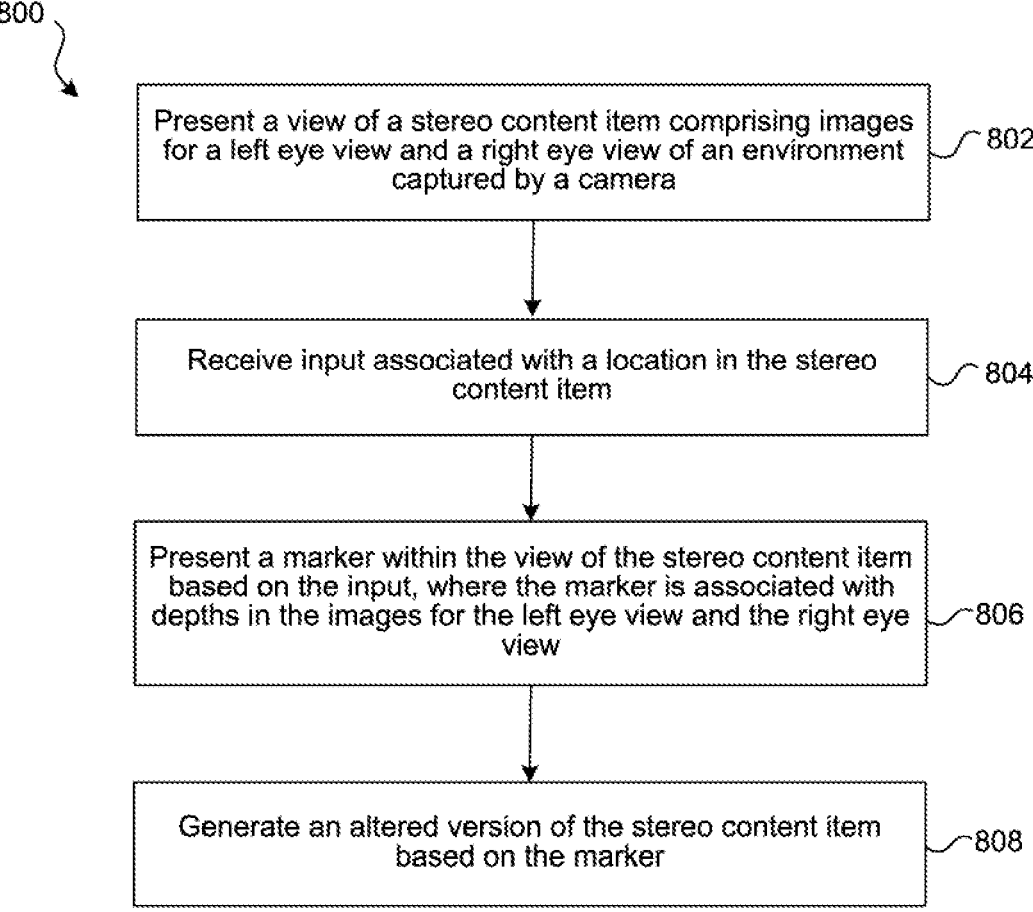

800

Present a view of a stereo content item comprising images for a left eye view and a right eye view of an environment captured by a camera ⟋ 802

Receive input associated with a location in the stereo content item ⟋ 804

Present a marker within the view of the stereo content item based on the input, where the marker is associated with depths in the images for the left eye view and the right eye view ⟋ 806

Generate an altered version of the stereo content item based on the marker ⟋ 808

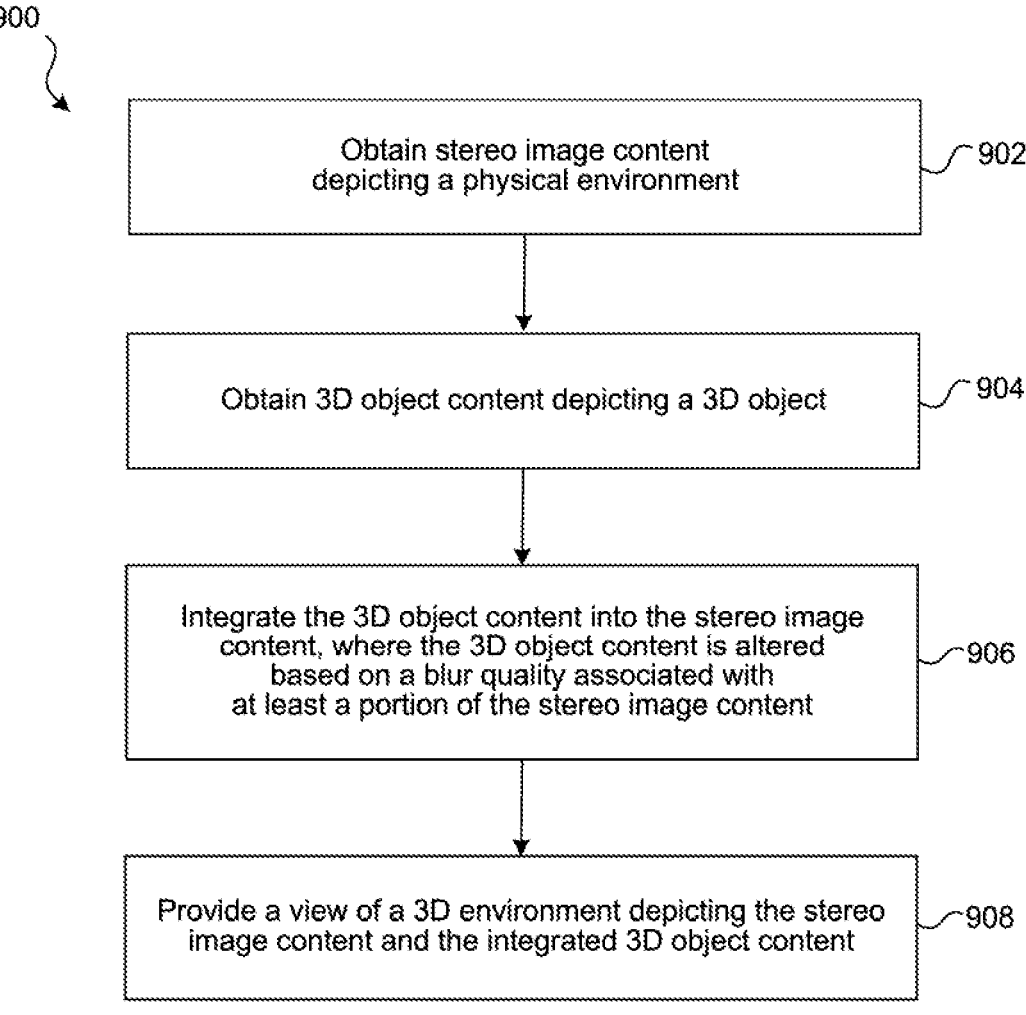

Obtain stereo image content
depicting a physical environment    902

Obtain 3D object content depicting a 3D object    904

Integrate the 3D object content into the stereo image
content, where the 3D object content is altered
based on a blur quality associated with
at least a portion of the stereo image content    906

Provide a view of a 3D environment depicting the stereo
image content and the integrated 3D object content    908

FIG. 9

Device 1000

Processing Unit(s) 1002

Comm. Interface(s) 1008

Display(s) 1012

Memory 1020

1004

I/O Device(s) & Sensor(s) 1006

Programming Interface(s) 1010

Image Sensor System(s) 1014

Operating System 1030

Instruction Set(s) 1040

Stereo Image Content Instruction Set 1042

3D Content Instruction Set 1044

Marker Instruction Set 1046

Integration Instruction Set 1048

STEREO DEPTH MARKERS

CROSS-REFERENCE TO RELATED APPLICATIONS

This Application claims the benefit of U.S. Provisional Application Ser. No. 63/392,637 filed Jul. 27, 2022, which is incorporated herein in its entirety.

TECHNICAL FIELD

The present disclosure generally relates to altering stereoscopic images of three dimensional (3D) environments to include added visual content, such as 3D objects added to appear at 3D positions within the 3D environments depicted in such images.

BACKGROUND

Various techniques are used to enable the capturing and editing of images, video, and other content depicting 3D environments. However, existing systems may not provide various desirable attributes, such as efficiently and/or accurately enabling the altering of stereo image content to include added content.

SUMMARY

Various implementations disclosed herein include devices, systems, and methods that modify stereoscopic image content of a 3D environment using a markers indicative of stereo depth. In one example, such a marker may be used to position content (e.g., computer-generated, virtual content, 3D objects, etc.) on top of/within the stereo image content by providing info about stereo depth, camera height, where features sit in depth in each eye's image, etc. In another example, a marker may additionally or alternatively be used to associate one or more objects, such as a tree depicted within the scene, with the background or foreground aspects/plates, which may then be rendered differently in providing the altered stereo image content.

In some implementations a processor performs a method by executing instructions stored on a computer readable medium. The method may be performed at a device having a processor. The method presents a view of a stereo content item comprising images for a left eye view and a right eye view of an environment. Such stereo image content may be captured by a camera. In some implementations, such a view is presented on a head mounted device (HMD), e.g., in which each eye is presented with a corresponding view from a slightly different perspective (e.g., based on interpupillary distance) of the captured/depicted environment. In other implementations, such a view is presented on a single display that can be viewed by both eyes and the display may provide depictions of the view of one or both eyes for the stereo content item, e.g., providing one or more fisheye views representing wide-angle views for one or both eyes.

The method receives input associated with a location in the stereo content item. For example, a user may provide input via hand gestures, voice commands, gaze, an input device, or any combination of these or other input mechanisms to identify a location in one (or both) of the stereo images in a stereo image pair of the stereo content item. For example, a user may provide input that identifies a depiction of a tree or a position on a ground surface in a frame of stereo content.

The method presents a marker within the view of the stereo content item based on the input. The marker may be associated with depths in the images, e.g., a depth of the location in a left eye image and a depth of the location in right eye view. The depths may correspond approximately to distances from the camera that captured the stereo content item to corresponding portions of the depicted 3D environment. Presenting the marker may involve assessing depths within the stereo content item using computer vision, tracking features across the left/right images of the stereo content item, identifying a surface in the stereo content item, identifying a normal direction of the surface, identifying an object in the stereo content item, generating a mask for the identified object, and various other features to position, orient, size, and/or otherwise configure the marker in an appropriate way that conveys depth and/or other information to the viewer. The marker may be positioned in each image of a stereo image pair of the stereo image content. Because of slight differences in the depictions of such a stereo image pair, the attributes of the marker may differ in each (e.g., being at different 2D pixel locations) but may correspond to the same 3D position in the depicted 3D environment, i.e., represent the same tree's position, the same spot on the ground depicted in the stereo image content, etc.

The method generates an altered version of the stereo content item based on the marker. This may involve (a) positioning content on top of/within the stereo scene based on the stereo depth marker and/or (b) associating an object with a background or foreground aspect/plate, which may be rendered differently. The altered version of the stereo content may be based on determining occlusions, shadows, etc.

Various implementations disclosed herein include devices, systems, and methods that modify stereo content item depicting a 3D environment by adding content (e.g., virtual 3D objects) with blurring that addresses resolution mismatch, e.g., a mismatch between the lower-resolution stereo camera capture and higher-resolution added content. Blurring may be done per eye since the slight differences in viewpoints may require significant differences in blurring. Blurring may be performed by locating a focal point and blurring content behind that focal point. In one example, no foreground blurring may be performed, only blurring of the background.

In some implementations a processor performs a method by executing instructions stored on a computer readable medium. The method may be performed at a device having a processor. The method obtains stereo image content depicting a physical environment and 3D object content (e.g., virtual content) depicting a 3D object (e.g., a fire, animal, nest, etc.). The 3D object content may be a stream of virtual content (e.g., multiple frames) representing movement or a changing appearance of the 3D object over time. The method integrates the 3D object content into the stereo image content, where the 3D object content is altered based on a blur quality associated with at least a portion of the stereo image content. The virtual content may be positioned within the stereo image pair at a given depth and that depth used to determine the amount of blurring to add to the object. In some implementations, blurring is added via a blurring algorithm, noise algorithm, or machine learning model. In some implementations, a portion of the stereo image content is input to a machine learning model that predicts and amount of blurring, blur kernel, blur attribute, blur pattern, etc. to be used to blur content added at the same depth as the portion of the stereo image content. The method provides a view of a 3D environment (e.g., an extended reality (XR)

environment) depicting (e.g., a projection of) the stereo image content and the integrated 3D object content.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 3 illustrates input associated with a location in the stereo content item of FIG. 2, in accordance with some implementations.

FIGS. 4A-B illustrate an exemplary marker in accordance with some implementations.

FIG. 5 illustrates an exemplary view of the stereo image content item of FIG. 2 with an added marker based on the input of FIG. 3, in accordance with some implementations.

FIG. 8 illustrates an exemplary process for altering stereo content based on a user-input-identified marker location, in accordance with some implementations.

FIG. 9 illustrates an exemplary process for integrating stereo image content and 3D object content in accordance with some implementations.

Figure 1:
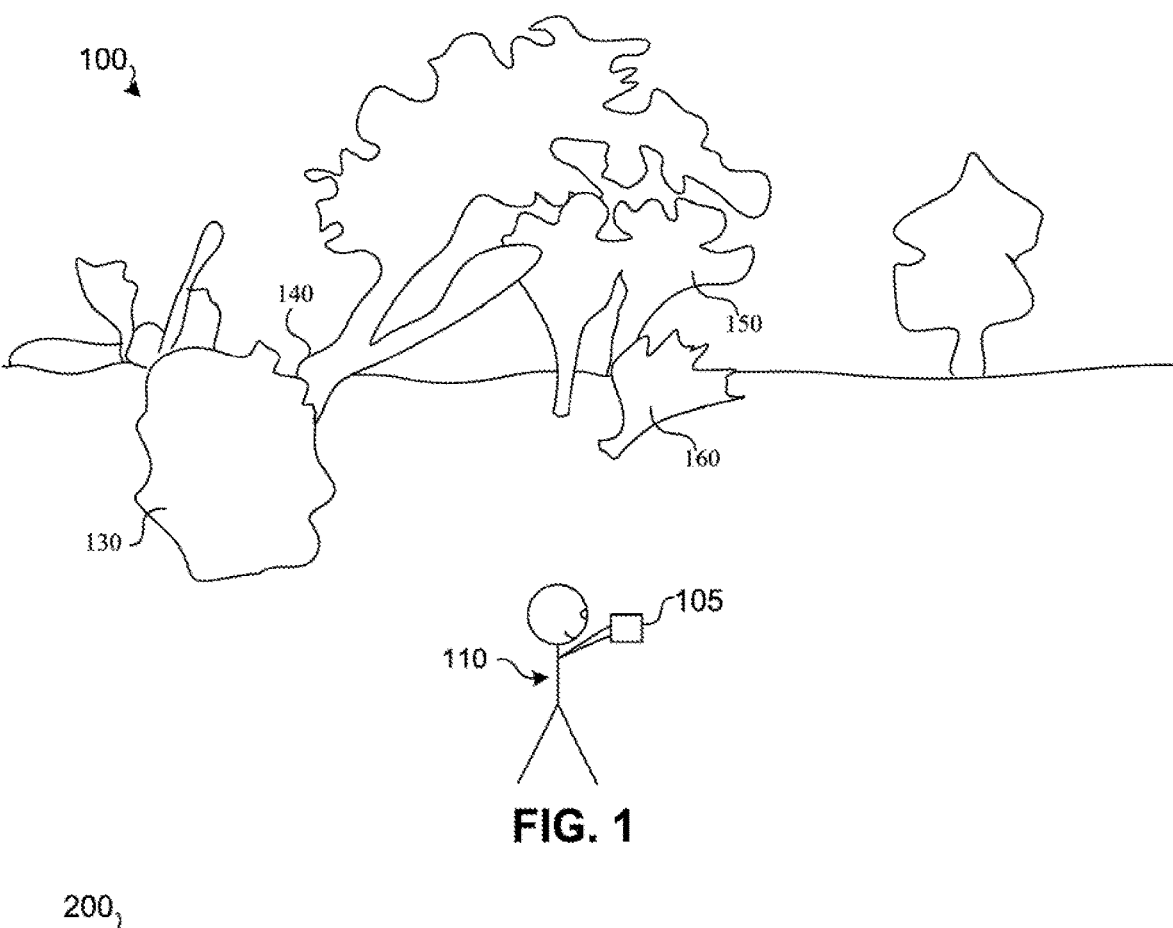
FIG. 1 illustrates an exemplary electronic device capturing stereo content in a physical environment, in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

FIG. 1 illustrates an exemplary electronic devices 105 operating in a physical environment 100. In FIG. 1, the physical environment 100 is an outdoor area that includes a first user 110 and various objects such as bushes 130, 150, 160 and tree 140. The electronic device 105 may include one or more cameras, microphones, depth sensors, or other sensors that can be used to capture information about and evaluate their physical environment 100 and the objects within the environment 100, as well as information about the user 110. The device 105 may capture and use information about the physical environment 100 from its sensors to provide stereo image content (e.g., a stereo image pair or stereo video) depicting the physical environment 100. In some implementations, the stereo image content is captured using multiple cameras (e.g., two cameras spaced apart from one another to capture left eye and right eye content). In some implementations, image content from a single camera is modified to generate stereo content, e.g., content for left eye and right eye views.

Figure 2:
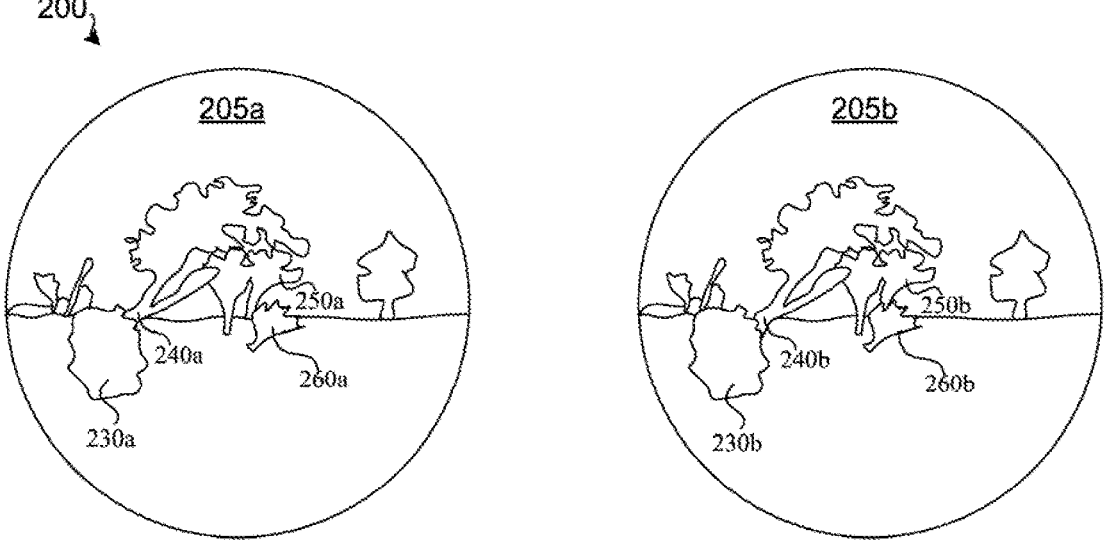
FIG. 2 illustrates an exemplary view of the stereo image content item captured in FIG. 1, in accordance with some implementations.

FIG. 2 illustrates a view of the stereo image content item 200 captured in FIG. 1. In this example, the view includes a left eye image 205a that includes a depiction of the physical environment 100 that includes a depiction 230a of the bush 130, a depiction 240a of the tree 140, a depiction 150a of the bush 150 and a depiction 260a of the bush 160. Similarly, the view also includes a right eye image 205b that includes a depiction of the physical environment that includes a depiction 230b of the bush 130, a depiction 240b of the tree 140, a depiction 150b of the bush 150 and a depiction 260b of the bush 160. The left eye image 220a and the right eye image 220b are not identical and represent views of the environment from slightly different viewpoints, i.e., viewpoints corresponding to a left eye and a right eye of a viewer. As a specific example, because of such a slight difference in viewpoint, depiction 230a may obscure more depiction 240a than depiction 230b obscures of depiction 240b.

FIG. 3 illustrates input associated with a location in the stereo content item of FIG. 2. In this example, a user may provide input identifying an object, region, or otherwise providing input from which a location within the stereo content item of FIG. 2 can be identified. In this example, a view 300 is presented on an electronic device and the user controls an input icon (i.e., hand icon 310) to select a position to the right of depiction 230a and below depiction 240a. In this example, the location corresponds to a location in the view 300 that depicts an area of ground in the physical environment 100.

As will be discussed next, such input may be used to position a marker within the stere content item, i.e., to provide altered stereo image content. Such a marker may have an appearance or visual characteristics that is configured to convey information such as 3D depth of the corresponding portion of the 3D environment that is depicted at the position of the marker.

FIGS. 4A-B illustrate an exemplary marker 400. In this example, the marker 400 has a relatively flat base 420 and a direction indicator 410 (i.e., a cube extending orthogonally in an upward direction from a top surface of the base 420. In this example, the direction indicator 410 also functions as an input affordance, e.g., a selectable item that can be selected and used to reposition the marker 400 relative to the stereo image content (and 3D environment depicted therein) based on user input. In other implementations, a marker has a different shape and/or different or no directional indicators and different or no repositioning affordances.

FIG. 5 illustrates an exemplary view of altered stereo image content item 500. The altered stereo image content item 500 includes the stereo image content item 200 of FIG. 2 with an added marker 510a, that is positioned based on the input illustrated in FIG. 3. The attributes of the marker may be determined based on the input illustrated in FIG. 3. The input may be used to position the marker within the environment depicted in the altered stereo content item 500. In this case, the marker is positioned on the ground at a spot and is depicted in both a left eye view 500a (as marker 510a) and a right eye view 500b (as marker 510b). In some implementations, the marker's location in one view is identified and used to position the marker at the same position (relative to the depicted environment) in the other eye's view. Such positioning may be based on known information about the views (e.g., the interpupillary distance (IPD) used to capture or generate the stereo image content) and the depth of the location relative to the viewpoint(s). In some implementations, the stereo image content may include depth data that was captured at the time the stereo image content was captured, e.g., via a depth sensor. In some implementations, the stereo image content includes depth data that is determined based on image data of the stereo image content, e.g., via an algorithm or machine learning model.

The marker (as depicted by markers 510a-b) represents a depth location within the environment depicted in the altered stereo image content 500. The size, shape, and/or orientation of the marker may indicate the marker's distance (from the viewpoint(s)) and/or orientation relative to objects and/or surfaces in the depicted environment. In this example, the marker's relatively small size indicates that it is relatively far from the viewpoint and the marker's orientation (appearing to be flat on the depicted ground surface) indicates that the marker is positioned to be resting atop that ground surface.

In the example of FIG. 5, the marker is depicted at the same position relative to the depicted physical environment but appears differently in the views 505a-b. Because of the slightly different viewpoints, the marker 510a appears to be closer to the depiction 230a in view 505a than the marker 510b appears to be to depiction 230b. However, if (and when) the views are presented simultaneously, e.g., using a stereoscopic viewing device such as a dual display head-mounted device (HMD), the marker may appear to the viewer to be at a single location given the stereoscopic display. Thus, the marker corresponds to a single location within the 3D environment depicted in the stereo image content. Such a marker may provide an indication to a viewer of a depth, orientation, and/or other attributes of a location within a depicted environment within stereo image content. It may also indicate whether content added at a given location will be partially or entirely occluded by other objects depicted in the stereo image content. Such a marker may enable the viewer to envision where and how added content (e.g., virtual objects) could be positioned within the depicted environment via modification to the stereo image content. Moreover, in some implementations, a user positions one or more such markers within a view of a stereo image content item and then uses the positioned markers to selectively add virtual content at one or more of the locations indicated by those markers.

Figure 6:
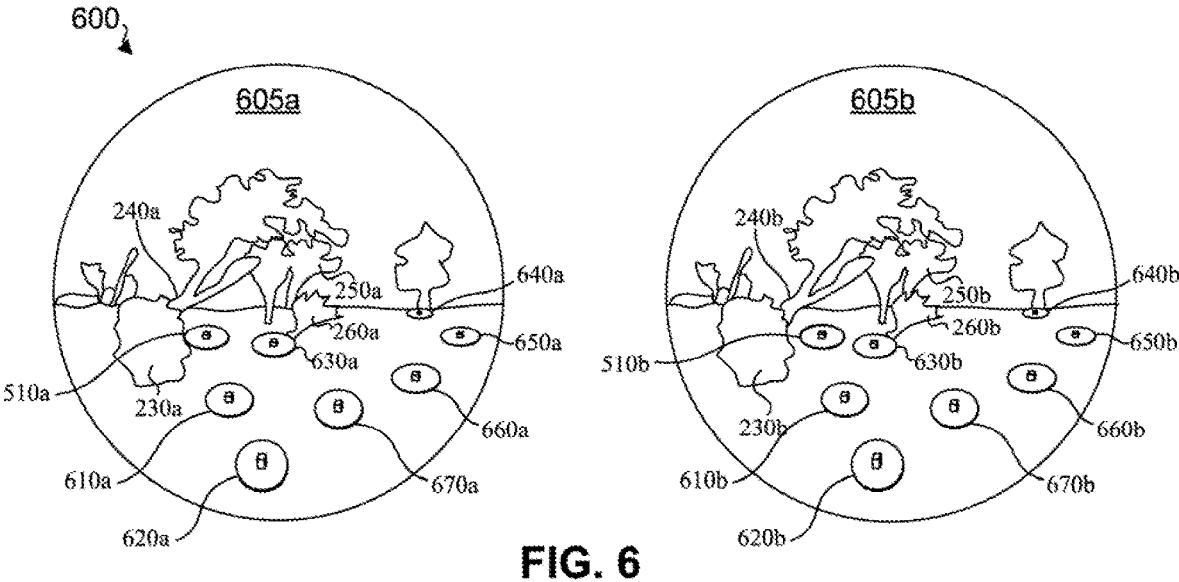
FIG. 6 illustrates an exemplary view of the stereo image content item of FIG. 2 with multiple added markers, in accordance with some implementations.

FIG. 6 illustrates an exemplary view of the stereo image content item of FIG. 2 with multiple added markers. In this example, the multiple added markers are automatically positioned based on automatic positioning criteria. Such criteria may specify types of surfaces (e.g., approximate flat, approximately level, ground or floor surfaces, etc.) and/or spacing criteria (e.g., distance thresholds relative to identified objects depicted within the stereo image content and/or distance thresholds relative to other markers).

In this example, a first added marker is depicted as marker 610a in a left eye view 605a and marker 610b in a right eye view 605b, a second added marker is depicted as marker 620a in a left eye view 605a and marker 620b in a right eye view 605b, a third added marker is depicted as marker 630a in a left eye view 605a and marker 630b in a right eye view 605b, a fourth added marker is depicted as marker 640a in a left eye view 605a and marker 640b in a right eye view 605b, a fifth added marker is depicted as marker 650a in a left eye view 605a and marker 650b in a right eye view 605b, a sixth added marker is depicted as marker 660a in a left eye view 605a and marker 660b in a right eye view 605b, and a seventh added marker is depicted as marker 670a in a left eye view 605a and marker 670b in a right eye view 605b.

As is illustrated, these markers have appearance attributes that are indicative of their position, distance away, and orientation. For example, the respective relative sizes of the markers illustrate their relative distances away from the viewpoint(s). As another example, the orientations of the markers correspond to the orientations of an underlying object or surfaces upon which the markers are positioned.

Views with added markers, as illustrated in FIGS. 5 and 6, may be presented to a user to enable the user to envision where additional content (e.g., virtual objects) may be positioned within a stereo content item. Additionally, or alternatively such views may be presented as part of a computer-based tool or other software package that enables the user to use the markers to position virtual content to be added within a stereo content item. For example, a user may select a virtual object and then select an already-positioned marker to indicate a position within the stereo image content at which the content may be added. In the case of multi-frame stereo image content, content may be added on a frame-by-frame basis or using an automated tool. Such an automated tool may determine a position for a virtual marker in multiple frames (e.g., a 3D position that is just right of tree in 5 consecutive frames) and a user may add virtual content to the corresponding position in those multiple frames collectively, e.g., using fewer input commands (e.g., a single input command) than would be required to add such content on a frame-by-frame basis.

Figure 7:
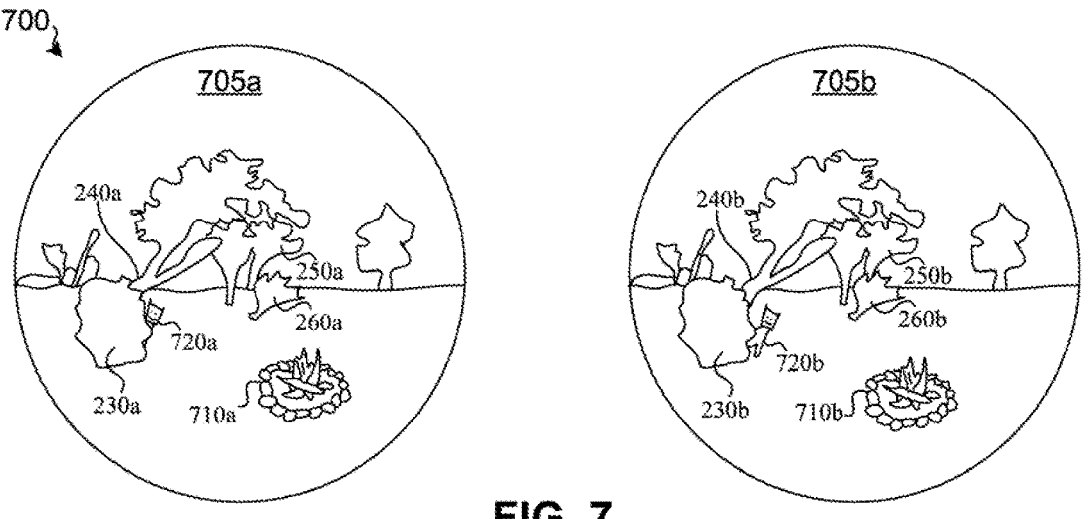
FIG. 7 illustrates an exemplary altered view of the stereo image content item of FIG. 2, in accordance with some implementations.

FIG. 7 illustrates an exemplary altered view of the stereo image content item of FIG. 2. In this example, a virtual object is added to the stereo content item to create altered stereo content item 700. In this altered stereo content item, a depiction 710a of a first virtual object (e.g., a virtual campfire) is positioned based on the location of the marker 670a in the left eye view 705a and a depiction 710b of the virtual object is positioned based on the location of the marker 670b in the right eye view 705b. Similarly, a depiction 720a of a second virtual object (e.g., a virtual animal) is positioned based on the location of the marker 720a in the left eye view 705a and a depiction 720b of the second virtual object is positioned based on the location of the marker 720*b* in the right eye view 705*b*.

Virtual content that is added to stereo image content may have differing visual characteristics than the stereo image content to which it is added. For example, a virtual object may have a higher resolution and/or better color quality than the stereo image content to which it is added. The original stereo image content may appear to be more blurred relative to added virtual content which may appear to be more crisp or detailed. In some implementations, blur is automatically applied to virtual content based on characteristics of the original stereo content. Such blurring may be depth specific (e.g., only blurring virtual content that is at least a threshold distance away or blurring content in a way that is dependent upon distance—more distance used to provide more blur, etc.). Such blurring may be dependent upon whether the virtual content that is being added is part of a defined portion of the stereo image content (e.g., part of the foreground, part of the background, etc.). A level of blur within stereo image content (or a particular portion of such content) may be determined based on known intrinsic camera data, camara capture conditions (e.g., light levels), or other information indicative of how blurry captured content will be. Alternatively, or additionally, a level of blur within stereo image content (or a particular portion of such content) may be determined based on evaluating the stereo image content itself, e.g., using an algorithm or machine learning model configured to predict a level of blur based on stereo image content input.

In some implementations, markers (e.g., as illustrated in FIGS. 5 and 6) indicate (e.g., by their size, shape, color, or other display characteristic) whether the marker (and thus any virtual content inserted using the marker) will be part of a foreground portion of the stereo image content or a background portion of the stereo image content. In some implementations, a user may manually designate whether a marker or virtual content object will be part of a particular portion, e.g., background or foreground. In some implementations, stereo image content is automatically separated into multiple portions (e.g., foreground/background) based on depth criteria, and markers and/or virtual content is associated with one of the multiple portions based on its position/depth once added to the stereo image content.

FIG. 8 is a flowchart illustrating a method 800 for altering stereo content based on a user-input-identified marker location. In some implementations, a device such as electronic device 105, or another device, or a combination of two or more of such devices, performs method 800. In some implementations, method 800 is performed on a mobile device, desktop, laptop, HMD, ear-mounted device or server device. The method 800 is performed by processing logic, including hardware, firmware, software, or a combination thereof. In some implementations, the method 800 is performed on a processor executing code stored in a non-transitory computer-readable medium (e.g., a memory).

At block 802, the method 800 presents a view of a stereo content item comprising images for a left eye view and a right eye view of an environment captured by a camera. The view of the stereo content item may be a stereoscopic view, for example, a stereoscopic view provided on a dual-display head-mounted device (HMD). Thus, presenting such a view may involve presenting the view on a dual-display HMD in which each eye (given its slightly different viewpoint) sees a slightly different view of an environment depicted by the stereo content item to provide the appearance of depth corresponding to the actual depth of the depicted 3D environment. In other implementations, the view of the stereo content item may be a fisheye view provided, for example, on a 2D display of a mobile phone or tablet computing device.

In some implementations, presenting the view may involve presenting a single view of the stereo content (e.g., only one eye's view).

In some implementations the stereo image content corresponds to a relatively wide-angle viewing area (e.g., 90 degrees, 120 degrees, 150 degrees, 180 degrees, panoramic content, etc.). The stereo image content may be a panoramic (e.g., 180°) stereo image pair or stereo video content, which may be stored, for example, as equirectangular projections. In some implementations, the view is depicted using a compressed, warped, or otherwise changed representation such as a fisheye view of wide-angle content.

The stereo image content may include or be associated with spatialized depth data which may have been obtained via depth sensors or derived from image data and which may be used to enable integration of the 3D object content.

At block 804, the method 800 receives input associated with a location in the content item. For example, a user may provide input via hand gestures, voice commands, gaze, an input device, or any combination of these or other input mechanisms to identify a location in one (or both) of the stereo images in a stereo image pair of the stereo content item. For example, user input may identify a rock, tree, front door, deer, or other object within the presented view of the stereo content item. In one example, a user provides input circling an object such as a bush and the method 800 interprets the input to identify one or more objects (e.g., identifying the bush) depicted in the stereo image content based on the circling.

At block, 806, the method presents a marker within the view of the stereo content item based on the input, where the marker is associated with depths in the images for the left eye view and the right eye view. Presenting the marker may involve assessing the depth within the stereo content item using a computer vision algorithm or machine learning model. The marker may be presented based on tracking features across the left/right images of the stereo content item, for example, to identify common locations (e.g., the same spot(s)) within the environment depicted in the left/right images. The marker may be presented based on identifying a surface in the stereo content item. The marker may be presented based on identifying a normal direction of an identified surface, e.g., by orienting the marker to graphically represent that normal direction. The marker may be presented based on identifying an object in the stereo content item, for example, based on identifying that an object of a particular type (e.g., animal, person, walkway, trail, road, floor, etc.) is depicted. In some implementations, a mask is generated identifying a portion of the stereo image content that corresponds to a particular object and/or identifying portions of the stereo image content that are not the object.

Presenting the marker may involve identifying a surface in the stereo content item, identifying a normal direction of the surface, and positioning the marker to appear to be resting on the surface in an orientation based on the normal direction of the surface.

At block 808, the method generates an altered version of the stereo content item based on the marker. This may involve, as non-limiting examples, (a) positioning content on top of/within the stereo scene based on the stereo depth marker and/or (b) associating an object with a background or foreground aspect/plate, which may be rendered differently. The altered version of the stereo content may be based on determining occlusions, shadows, etc. Thus, generating the altered version of the stereo content item may involve positioning computer generated content to appear to be at the depths of the marker in the images for the left eye view and the right eye view. In another example, generating the altered version of the stereo content item comprises determining an occlusion based on the marker. In another example, generating the altered version of the stereo content item comprises determining a shadow based on the marker. In another example, generating the altered version of the stereo content item comprises associating an object with a background or foreground portion/plate.

The method 800 may further involve automatically determining a second location in the stereo content item, presenting a second marker within the view of the stereo content item based on the second location, where the second marker is associated with second depths in the images for the left eye view and the right eye view, and generating an altered version of the stereo content item based on the second marker.

In some implementations, a marker is positioned based on user input but such positioning is restricted based on certain criteria. For example, method 800 may involve restricting the positioning of the marker based on criteria restricting positioning of computer-generated content within the view, e.g., based on threshold requirements with respect to proximity to other objects depicted in the content, based on threshold requirements with respect to depths of marker/content placement, etc. As examples, a user may be limited to positioning markers only on flat surfaces, only on floor surfaces, only at positions within 50 feet (depth) of the viewpoint, etc.

In some implementations, the method 800 uses depth information associated with multiple markers positioned within the view to position computer-generated content at different relative depths. For example, a first virtual object may be placed at a first depth using a first marker and a second virtual object may be placed at a second (different) depth using a second marker.

In some implementations, the 3D object content may be integrated into the stereo image content. Integrating the 3D object content into the stereo image content may involve rendering the 3D object content into each of a left eye image and a right eye image of the stereo image content. The integrating may involve selecting appropriate positioning of the 3D object (e.g., based on one or more marker positions) and identifying occlusions and/or shadows. Integrating the 3D object content into the stereo image content may involve detecting planes or depths in the 3D stereo content and positioning the 3D object content based on the detecting. Integrating the 3D object content into the stereo image content may involve detecting planes or depths in the stereo image content and determining an occlusion for the 3D object content based on the detecting.

The depicted 3D environment and the added content need not be static. Thus, for example, over time, content may be updated and re-rendered into the stereo pair to update its pose/appearance. A virtual character may be inserted into multi-frame stereo image content, such that both the depictions of the environment and the added virtual character appear to change over time, i.e., over the course of the multiple frames. Integrating 3D object content into the stereo image content may involve receiving time-varying 3D object content for a plurality of instances in time and integrating the time-varying 3D object content for each of the plurality of instances in time with the stereo image content. The stereo image content may be updated based on viewer position to provide parallax. Integrating the 3D object content into the stereo image content may involve selecting a stereo image pair of the stereo image content based on a viewer position and integrating the 3D object content into the selected stereo image pair.

The stereo image content may be updated to show shadows from the 3D object. Thus, integrating the 3D object content into the stereo image content may involve altering the stereo image content to show a shadow of the 3D object.

FIG. 9 illustrates an exemplary process for integrating stereo image content and 3D object content. In some implementations, a device such as electronic device 105, or another device, or a combination of two or more of such devices, performs method 900. In some implementations, method 900 is performed on a mobile device, desktop, laptop, HMD, ear-mounted device or server device. The method 900 is performed by processing logic, including hardware, firmware, software, or a combination thereof. In some implementations, the method 900 is performed on a processor executing code stored in a non-transitory computer-readable medium (e.g., a memory).

At block 902, the method 900 obtains stereo image content depicting a physical environment. The stereo image content may have been captured by a stereo camera. The stereo image content may be wide-angle, e.g., a 180° stereo image pair or 180° stereo video content stored as projections (e.g., equirectangular). Depth data may also be obtained and used to enable integration of the 3D object content.

At block 904, the method 900 obtains three-dimensional (3D) object content (e.g., virtual content) depicting a 3D object (e.g., a fire, animal, nest, etc.). The 3D object content may be a stream of virtual content representing movement or a changing appearance of the 3D object over time.

At block 906, the method 900 integrates the 3D object content into the stereo image content, where the 3D object content is altered based on a blur quality associated with at least a portion of the stereo image content. The virtual content may be positioned within the stereo image pair (as described herein or otherwise). The virtual content may be positioned based on detected planes, floors, depths, etc. The stereo content may be inspected and depths of different portions of the stereo content used to provide occlusions and positioning. The stereo content may be updated to show shadows from 3D object.

Integrating the 3D object content into the stereo image content may involve rendering the 3D object content into each of a left eye image and a right eye image of the stereo image content. Integrating the 3D object content into the stereo image content may involve determining how to alter the 3D object content for the left eye image and the right eye image independently.

Integrating the 3D object content into the stereo image content may involve determining a depth associated with a position identified for the 3D object, detecting the blur quality of the at least a portion of the stereo image content based on the determined depth, and blurring the 3D object content based on the blur quality.

In some implementations, integrating the 3D object content into the stereo image content may involve determining a focal point and detecting whether to alter the 3D object content based on the focal point.

Integrating the 3D object content into the stereo image content may involve detecting planes or depths in the 3D stereo content and positioning the 3D object content based on the detecting. Integrating the 3D object content into the stereo image content may involve detecting planes or depths in the stereo image content and determining an occlusion for the 3D object content based on the detecting. Integrating the 3D object content into the stereo image content comprises altering the stereo image content to show a shadow of the 3D object.

Integrating the 3D object content into the stereo image content may involve receiving time-varying 3D object content for a plurality of instances in time and integrating the time-varying 3D object content for each of the plurality of instances in time with the stereo image content.

At block 908, the method provides a view of a 3D environment (e.g., an XR environment) depicting (e.g., a projection of) the stereo image content and the integrated 3D object content.

In some implementation, the stereo image content depicts a background (e.g., relatively distant objects and surroundings) for the 3D object that is added, e.g., in the foreground, e.g., at a relatively closer position.

Figure 10:
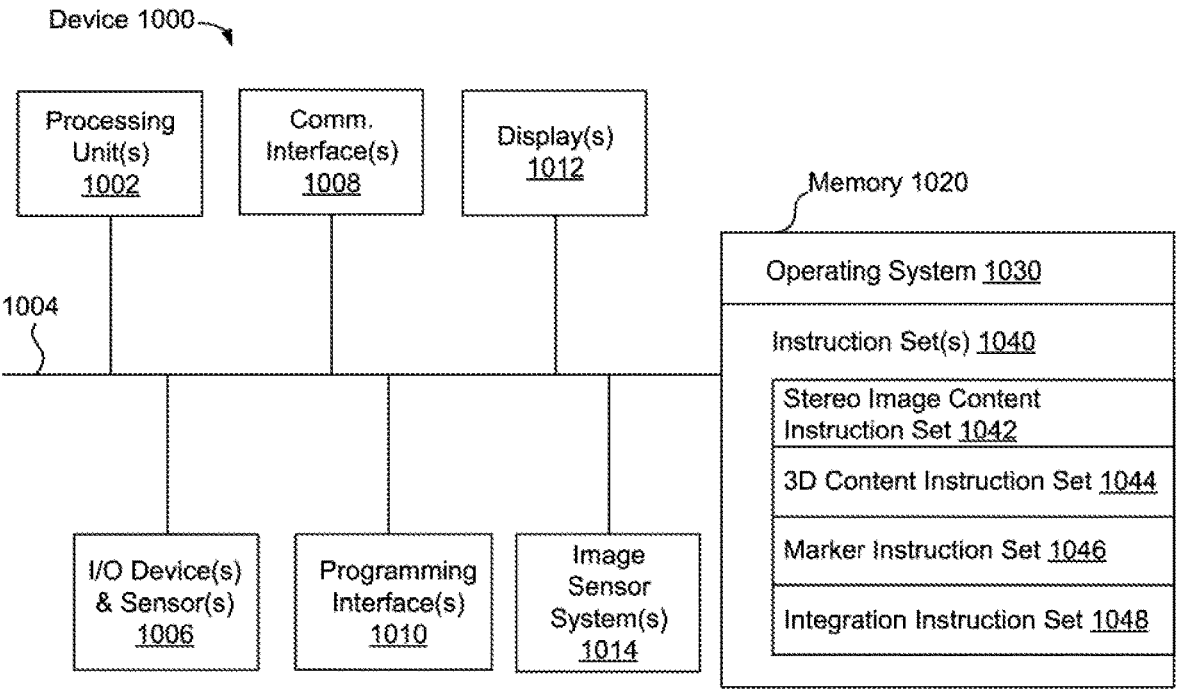
FIG. 10 is a block diagram of an electronic device of in accordance with some implementations.

FIG. 10 is a block diagram of electronic device 1000. Device 1000 illustrates an exemplary device configuration for such as electronic device 105 that may perform one or more of the techniques disclosed herein. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 1000 includes one or more processing units 1002 (e.g., microprocessors, ASICs, FPGAs, GPUs, CPUs, processing cores, and/or the like), one or more input/output (I/O) devices and sensors 1006, one or more communication interfaces 1008 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 1010, one or more output device(s) 1012, one or more interior and/or exterior facing image sensor systems 1014, a memory 1020, and one or more communication buses 1004 for interconnecting these and various other components.

In some implementations, the one or more communication buses 1004 include circuitry that interconnects and controls communications between system components. In some implementations, the one or more I/O devices and sensors 1006 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more output device(s) 1012 include one or more displays configured to present a view of a 3D environment to the user. In some implementations, the one or more displays 1012 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays correspond to diffractive, reflective, polarized, holographic, etc. waveguide displays. In one example, the device 1000 includes a single display. In another example, the device 1000 includes a display for each eye of the user.

In some implementations, the one or more output device(s) 1012 include one or more audio producing devices. In some implementations, the one or more output device(s) 1012 include one or more speakers, surround sound speakers, speaker-arrays, or headphones that are used to produce spatialized sound, e.g., 3D audio effects. Such devices may virtually place sound sources in a 3D environment, including behind, above, or below one or more listeners. Generating spatialized sound may involve transforming sound waves (e.g., using head-related transfer function (HRTF), reverberation, or cancellation techniques) to mimic natural soundwaves (including reflections from walls and floors), which emanate from one or more points in a 3D environment. Spatialized sound may trick the listener's brain into interpreting sounds as if the sounds occurred at the point(s) in the 3D environment (e.g., from one or more particular sound sources) even though the actual sounds may be produced by speakers in other locations. The one or more output device(s) 1012 may additionally or alternatively be configured to generate haptics.

In some implementations, the one or more image sensor systems 1014 are configured to obtain image data that corresponds to at least a portion of a physical environment. For example, the one or more image sensor systems 1014 may include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 1014 further include illumination sources that emit light, such as a flash. In various implementations, the one or more image sensor systems 1014 further include an on-camera image signal processor (ISP) configured to execute a plurality of processing operations on the image data.

The memory 1020 includes high-speed random-access memory, such as DRAM, SRAM, DDR RAM, or other random-access solid-state memory devices. In some implementations, the memory 1020 includes non-volatile memory, such as one or more magnetic disk storage devices, optical disk storage devices, flash memory devices, or other non-volatile solid-state storage devices. The memory 1020 optionally includes one or more storage devices remotely located from the one or more processing units 1002. The memory 1020 comprises a non-transitory computer readable storage medium.

In some implementations, the memory 1020 or the non-transitory computer readable storage medium of the memory 1020 stores an optional operating system 1030 and one or more instruction set(s) 1040. The operating system 1030 includes procedures for handling various basic system services and for performing hardware dependent tasks. In some implementations, the instruction set(s) 1040 include executable software defined by binary information stored in the form of electrical charge. In some implementations, the instruction set(s) 1040 are software that is executable by the one or more processing units 1002 to carry out one or more of the techniques described herein.

The instruction set(s) 1040 include a stereo image content instruction set 1042 configured to, upon execution, capture, generate, use, share, or render stereo image content as described herein. The instruction set(s) 1040 further include a 3D content instruction set 1044 configured to, upon execution, capture, generate, use, share, or render 3D content such as a virtual 3D object, as described herein. The instruction set(s) 1040 further include a marker instruction set 1046 configured to, upon execution, position and present markers within views of stereo image content, as described herein. The instruction set(s) 1040 further include an integration instruction set 1048 configured to, upon execution, provides integrate 3D content into stereo image content, as described herein. The instruction set(s) 1040 may be embodied as a single software executable or multiple software executables.

Although the instruction set(s) 1040 are shown as residing on a single device, it should be understood that in other implementations, any combination of the elements may be located in separate computing devices. Moreover, FIG. 10 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:

at an electronic device having a processor:

presenting a view of a stereo content item comprising images for a left eye view and a right eye view of an environment captured by a camera;

receiving input associated with a location in the stereo content item;

presenting a marker within the view of the images of the stereo content item based on the input, wherein the marker is associated with depths in the images for the left eye view and the right eye view and the marker conveys a depth in the environment depicted in the images of the stereo content item for addition of virtual content; and generating an altered version of the stereo content item based on the marker, wherein the stereo content item is altered by removing the marker from the images of the stereo content item and adding the virtual content by positioning the virtual content within the images of the stereo content item based on the depth conveyed by the marker for addition of the virtual content in the environment depicted in the images of the stereo content item.

2. The method of claim 1, wherein the view of the stereo content item is a stereoscopic view provided on dual-display head-mounted device (HMD).

3. The method of claim 1, wherein the view of the stereo content item is a fisheye view provided on a 2D display.

4. The method of claim 1, wherein receiving the input comprises receiving input identifying a portion of the view.

5. The method of claim 1, wherein presenting the marker comprises determining the depths within the images for the left eye view and the right eye view using a computer vision algorithm or machine learning model.

6. The method of claim 1, wherein presenting the marker comprises tracking features across the images for the left eye view and the right eye view.

7. The method of claim 1, wherein presenting the marker comprises:

identifying a surface in the stereo content item;

identifying a normal direction of the surface; and positioning the marker to appear to be resting on the surface in an orientation based on the normal direction of the surface.

8. The method of claim 1, wherein presenting the marker comprises:

identifying an object in the stereo content item; and generating a mask for the identified object.

9. The method of claim 1, wherein generating the altered version of the stereo content item comprises positioning computer generated content to appear to be at the depths of the marker in the images for the left eye view and the right eye view.

10. The method of claim 1, wherein generating the altered version of the stereo content item comprises determining an occlusion based on the marker.

11. The method of claim 1, wherein generating the altered version of the stereo content item comprises determining a shadow based on the marker.

12. The method of claim 1, wherein generating the altered version of the stereo content item comprises associating an object with a background or foreground plate.

13. The method of claim 1 further comprising:

automatically determining a second location in the stereo content item;

presenting a second marker within the view of the stereo content item based on the second location, wherein the second marker is associated with second depths in the images for the left eye view and the right eye view; and generating another altered version of the stereo content item based on the second marker.

14. The method of claim 1 further comprising restricting positioning of the marker based on criteria restricting positioning of computer-generated content within the view.

15. The method of claim 1, wherein depth information associated with multiple markers positioned within the view are used to position computer-generated content at different relative depths.

16. The method of claim 1, wherein the marker is temporary such that the altered version of the stereo excludes the marker.

17. A system comprising:

a non-transitory computer-readable storage medium; and one or more processors coupled to the non-transitory computer-readable storage medium, wherein the non-transitory computer-readable storage medium comprises program instructions that, when executed on the one or more processors, cause the system to perform operations comprising:

presenting a view of a stereo content item comprising images for a left eye view and a right eye view of an environment captured by a camera;

receiving input associated with a location in the stereo content item;

presenting a marker within the view of the images of the stereo content item based on the input, wherein the marker is associated with depths in the images for the left eye view and the right eye view and the marker conveys a depth in the environment depicted in the images of the stereo content item for addition of virtual content; and generating an altered version of the stereo content item based on the marker, wherein the stereo content item is altered by removing the marker from the images of the stereo content item and adding the virtual content by positioning the virtual content within the images of the stereo content item based on the depth conveyed by the marker for addition of the virtual content in the environment depicted in the images of the stereo content item.

18. The system of claim 17, wherein the view of the stereo content item is a stereoscopic view provided on dual-display head-mounted device (HMD).

19. The system of claim 17, wherein the view of the stereo content item is a fisheye view provided on a 2D display.

20. The system of claim 17, wherein receiving the input comprises receiving input identifying a portion of the view.

21. A non-transitory computer-readable storage medium storing program instructions executable via one or more processors to perform operations comprising:

obtaining stereo image content depicting a context environment;

presenting a view of a stereo content item comprising images for a left eye view and a right eye view of an environment captured by a camera;

receiving input associated with a location in the stereo content item;

presenting a marker within the view of the images of the stereo content item based on the input, wherein the marker is associated with depths in the images for the left eye view and the right eye view and the marker conveys a depth in the environment depicted in the images of the stereo content item for addition of virtual content; and generating an altered version of the stereo content item based on the marker, wherein the stereo content item is altered by removing the marker from the images of the stereo content item and adding the virtual content by positioning the virtual content within the images of the stereo content item based on the depth conveyed by the marker for addition of the virtual content in the environment depicted in the images of the stereo content item.

* * * * *